United States Patent [19]

Chung

[11] Patent Number: 4,477,916
[45] Date of Patent: Oct. 16, 1984

[54] TRANSMITTER FOR ANGLE-MODULATED SIGNALS

[75] Inventor: Kah-Seng Chung, Eindhoven, Netherlands

[73] Assignee: U.S. Philips Corporation, New York, N.Y.

[21] Appl. No.: 357,245

[22] Filed: Mar. 11, 1982

[30] Foreign Application Priority Data

Apr. 1, 1981 [NL] Netherlands .......................... 8101611

[51] Int. Cl.³ ............................................. H03K 25/49
[52] U.S. Cl. ..................................... 375/60; 332/9 R; 332/18; 375/62
[58] Field of Search ................. 332/9 R, 10, 16 R, 18; 364/724; 375/60, 62, 65, 66

[56] References Cited

U.S. PATENT DOCUMENTS

| | | | |
|---|---|---|---|
| 3,793,588 | 2/1974 | Gerwen | 375/62 |
| 3,890,581 | 6/1975 | Stuart et al. | 375/62 |
| 4,003,002 | 1/1977 | Snigders et al. | 375/60 |
| 4,041,239 | 8/1977 | Haass | 375/60 |

*Primary Examiner*—Benedict V. Safourek
*Attorney, Agent, or Firm*—Thomas A. Briody; William J. Streeter

[57] ABSTRACT

Transmitter for angle-modulated signals having an input for binary signals, a premodulation filter and a frequency modulation arrangement.

In order to improve the error rate of the system of transmitter and receiver a premodulation filter is used having a pulse response h(t):

$$h(t) = g(t) - \sum_{n=1}^{N} a(n)[g(t - nT) + g(t + nT)],$$

wherein g(t) is the pulse response of a Gaussian low-pass filter and T the duration of a binary signal element.

The postdemodulation filter 6-4 (6-5) has a pulse response of the same general form for optimum results.

3 Claims, 6 Drawing Figures

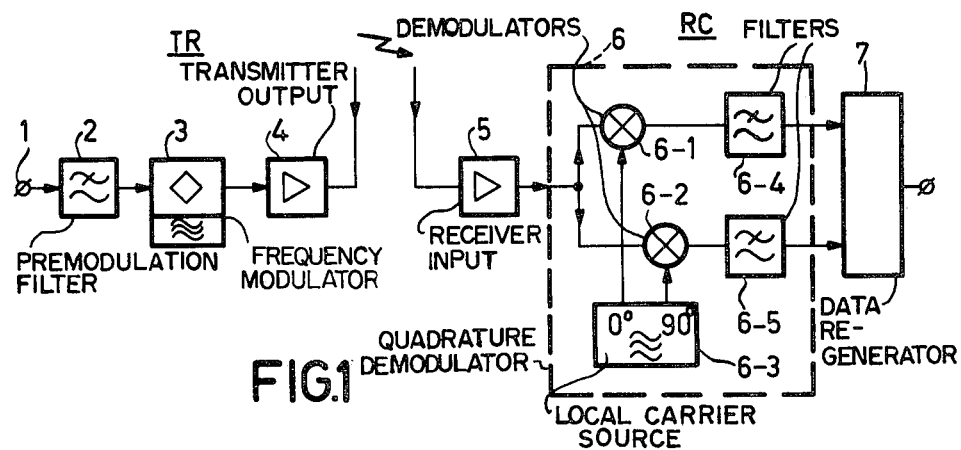
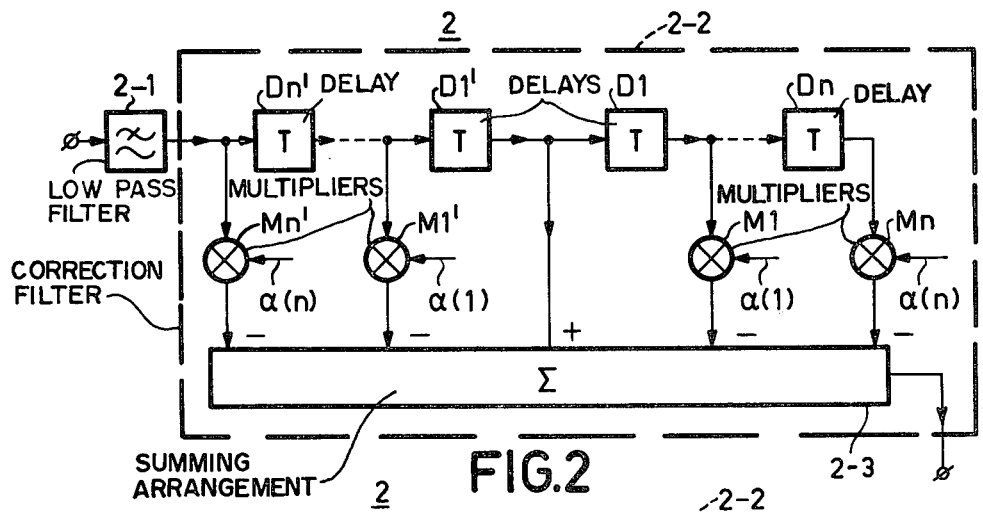
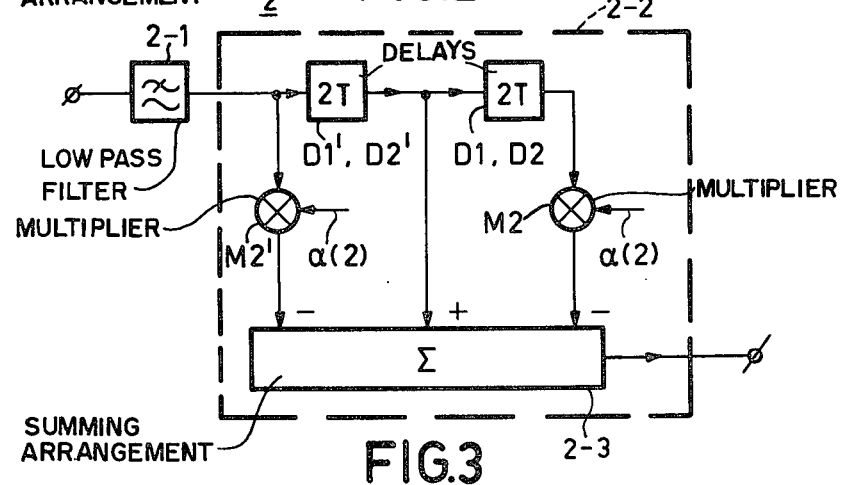

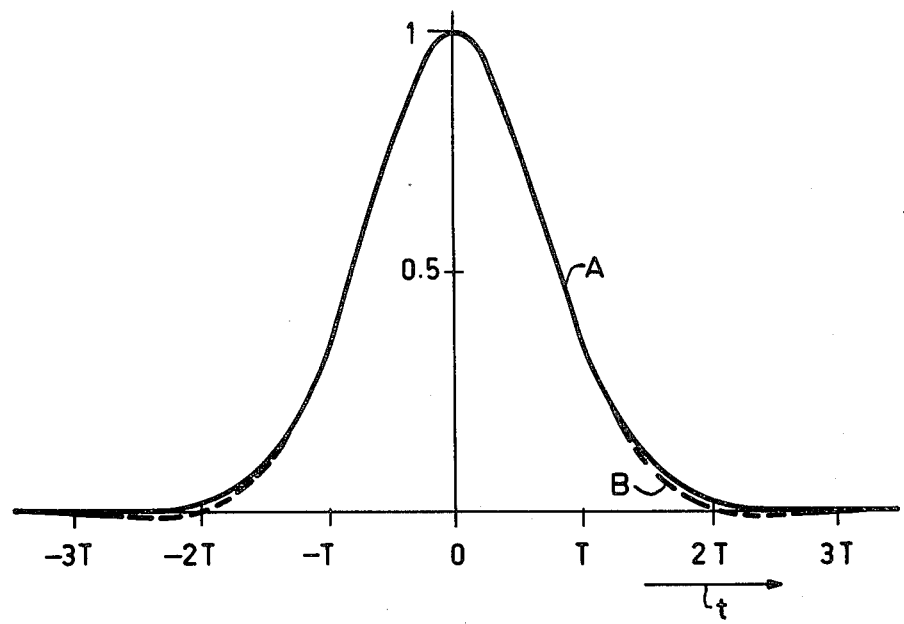
FIG.4
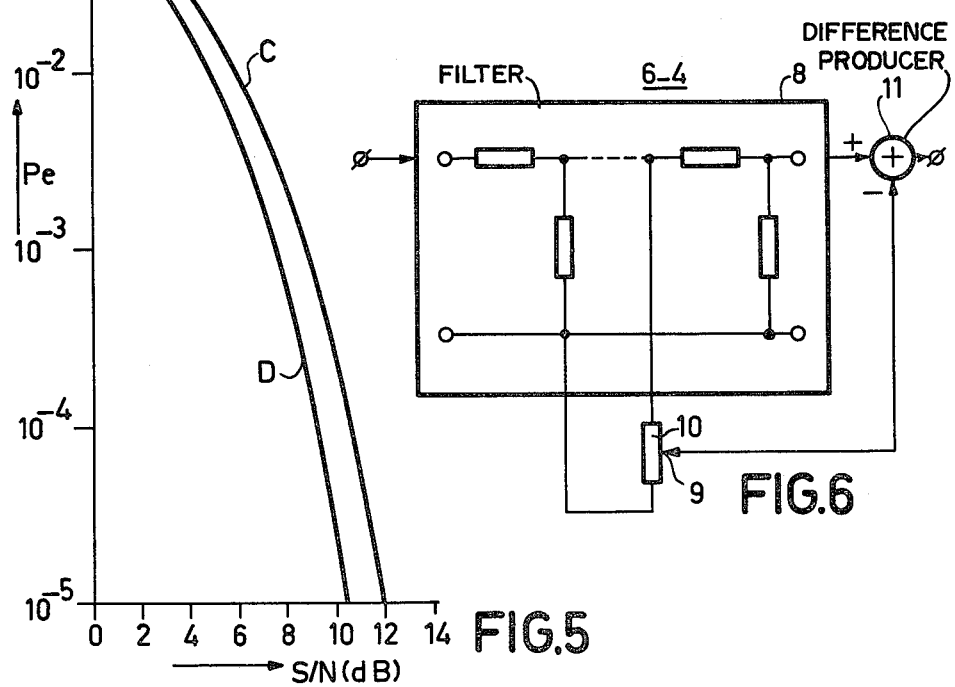
FIG.5
FIG.6

TRANSMITTER FOR ANGLE-MODULATED SIGNALS

BACKGROUND OF THE INVENTION

1. Field of the Invention

The invention relates to a transmitter for angle-modulated signals having an input for synchronous binary signals, which is connected to a premodulation filter the output of which is connected to the signal input of a frequency modulation arrangement serving to provide in response to an input signal voltage an output signal at a frequency which linearly depends on the signal voltage.

2. DESCRIPTION OF THE PRIOR ART

A transmitter of the above-defined type is known from the Proceedings of the 29th IEEE Vehicular Technology Conference, Arlington, Ill., USA, Mar. 27–30, 1979, pages 13–19.

This prior art transmitter has the advantage that a good suppression of the out-of-band power spectrum is obtained so that smaller channel spacings or larger transmission rates or a higher transmission power, as the case may be, or a combination thereof may be employed.

In said prior art transmitter a low-pass filter having a pass characteristic which is a Gaussian curve, such a filter being commonly referred to as a Gaussian low-pass filter, is used as the premodulation filter.

A system comprised of a transmitter and a receiver is usually optimized for an optimal signal-to-noise ratio by means of a filter, which is commonly referred to as a post-modulation filter, in the receiver. In the above-mentioned publication a Gaussian filter is used as the post modulation filter, this filter being connected in front of the detector and being indicated as a predetection filter.

It is an object of the invention to provide a transmitter of the type defined in the preamble, in which the suppression of the out-of-band power spectrum is at least equally good as that of the known transmitter, which, however, can accomplish in the system of transmitter and receiver a significant improvement of the error rate as a function of the signal-to-noise ratio.

SUMMARY OF THE INVENTION

The transmitter according to the invention is characterized in that the premodulation filter has a pulse response h(t) in accordance with the expression:

$$h(t) = g(t) - \sum_{n=1}^{N} \alpha(n)[g(t - nT) + g(t + nT)]$$

wherein g(t) is the pulse response of a Gaussian lowpass filter, T is a time delay equal to the duration of a binary signal element and n is an integer.

In a practical situation it may not be necessary to go further than a low value of n, for example $n \leq 4$.

For optimum results the post-modulation filter in the receiver, which is situated behind the detection or demodulation stage (postdemodulation filter) will have a pulse response of the same general shape, optionally with a larger band width and other values for the factors $\alpha(n)$, to realize a maximum signal-to-noise ratio.

The present invention will now be explained and described, by way of example, with reference to the accompanying drawing.

DESCRIPTION OF THE DRAWING

FIG. 1 is the block schematic circuit diagram of a prior art radio transmission system, comprised of a transmitter and a receiver;

FIG. 2 is the block schematic circuit diagram of a premodulation filter for use in the transmitter in accordance with the invention.

FIG. 3 is the block schematic circuit diagram of a simplified premodulation filter;

FIG. 4 shows the impulse response of a Gaussian low-pass filter (A) and the impulse response of a premodulation filter shown in FIG. 3 (B);

FIG. 5 shows the error rate Pe as a function of the signal-to-noise ratio in the system shown in FIG. 1 having Gaussian premodulation and post-modulation filters and with premodulation and post-modulation filters of the type shown in FIG. 3 (D).

FIG. 6 is the block schematic circuit diagram of a post-demodulation filter for use in the receiver of the system shown in FIG. 1.

DESCRIPTION OF THE PREFERRED EMBODIMENTS

The system shown in FIG. 1 comprises a transmitter TR and a receiver RC.

The transmitter TR has an input 1 for synchronous binary data signals, which is connected to a low-pass premodulation filter 2. The output thereof is connected to the signal input of a frequency modulation arrangement 3. This last-mentioned arrangement produces an output signal at a frequency which is a linear function of the voltage on the signal input. In its simplest form the arrangement 3 may be in a voltage-controlled oscillator (VCO). In practice, it is possible to provide in known manner means for stabilising the central frequency and the frequency swing. The output signal of modulation arrangement 3 is applied to the output portion 4 of the transmitter, which may comprise in known manner one or more amplifier and/or frequency translation stages.

The receiver RC comprises an input portion 5, which may comprise in known manner one or more RF- and IF-amplifier stages and demodulation stages. The output of the input portion is connected to a quadrature demodulation arrangement 6, the outputs of which are connected to the data regenerator 7.

The demodulation arrangement 6 comprises the demodulators 6-1 and 6-2 which are controlled by two orthogonal signals which are supplied by the local carrier source 6-3, at a frequency which is equal to the central frequency of the output signal of the input portion 5. The low-pass postdemodulation filters 6-4 and 6-5 are connected to the outputs of the demodulators 6-1 and 6-2. The outputs of said filters form the outputs of the demodulation arrangement 6.

A transmitter and a receiver of the described type are known from, for example, the above-mentioned publication.

In the said publication the case is considered in which the frequency swing $\Delta f$ of the frequency modulation arrangement 3 is one quarter of the bit rate fb in Hertz, that is to say $\Delta f = fb/4$. As mentioned in the publication this corresponds to the condition for MSK-modulation, the phase changing in one symbol period T by an amount equal to $\pi/2$.

In addition, in the said publication the case is considered in which the premodulation filter 12 is a Gaussian low-pass filter and different values of the standardised band width Bb.T thereof are considered. Particular mention is made of the value Bb.T=0.19 at which value a suppression of the out-of-band power spectrum of the output signal of the modulation arrangement 3 is obtained, which is almost equal to that for TFM-modulation (tamed frequency modulation; reference 25 of the said publication).

An optimum signal-to-noise ratio at the outputs of the demodulation arrangement 6 depends on the shaping of the signal by the premodulation filter 2 and the postdemodulation filter 6-4 (6-5) and the shaping of the noise by the postdemodulation filter 6-4 (6-5). Part of the shaping of the signal in the receiver RC or even the whole shaping operation may be accomplished in the IF-stages of the input portion 5. In the following description it will be assumed that the shaping operation is concentrated in the postdemodulation filters 6-4 and 6-5.

In the said publication the case is considered in which the shaping of the signal in the receiver is performed by a predetection Gaussian band-pass filter, that is to say a filter located in the input portion 5. The bandwidth of this filter will then be twice the bandwidth of an equivalent postdemodulation filter. In the publication special consideration is given to a Gaussian band-pass filter having a relative bandwidth B.T=0.75 to realize a minimal error rate. This corresponds to a relative bandwidth Bb.T=0.375 for the postdemodulation filter 6-4 (6-5).

It has been found that the error rate can be considerably improved without causing any deterioration in the suppression of the out-of-band power spectrum by constructing the premodulation filter 2 as shown in FIG. 2 and by using a correspondingly constructed postdemodulation filter 6-4 (6-5).

The premodulation filter 2 shown in FIG. 2 comprises a Gaussian low-pass filter 2-1 and a correction filter 2-2. The latter filter comprises a cascade of 2n delay sections Dn', ..., D1', D1, ... Dn, each having a time delay of T sec., wherein T sec. represents the duration of one symbol period of the binary input signal at input 1. The input signals of the sections dn', ... D1 and the output signals of the sections D1, ... Dn are applied, after multiplication by the positive factors $\alpha(n)$, ... $\alpha(1)$ and $\alpha(1)$, ... $\alpha(n)$, respectively applied by the multipliers Mn', ... M1' and M1, ... Mn, respectively to the signal summing arrangement 2-3. Herein said signals are subtracted from the signal which is directly applied to arrangement 2-3 from the output of section D1'.

The impulse response h(t) of the premodulation filter shown in FIG. 2 may be represented by:

$$h(t) = g(t) - \sum_{n=1}^{N} \alpha(n)[g(t-nT) + g(t+nT)] \quad (1)$$

wherein g(t) represents the impulse response of the Gaussian low-pass filter 2-1.

A simplified embodiment of filter 2 is shown in FIG. 3. This corresponds to the case that $\alpha(n) \neq 0$ for n=2 and $\alpha(n)=0$ for n=1 and for n>2.

In FIG. 4 curve A illustrates the impulse response of the Gaussian low-pass filter 2-1 with Bb.T=0.19 and curve B illustrates the pulse response of the combination of the same filter 2-1 with Bb.T=0.19 and the correction filter 2-2 shown in FIG. 3 with $\alpha(2)=0.02$.

In FIG. 5 curve C illustrates the error rate Pe as a function of the signal-to-noise ratio S/N of the known system having a Gaussian premodulation filter 2 with Bb.T=0.19 in the transmitter and a Gaussian postdemodulation filter 6-4 (6-5) with Bb.T=0.375 in the receiver. It should be noted that in the publication it was demonstrated that this last-mentioned value is an optimum value, independent of the value of Bb.T of the filter in the transmitter. The curve D illustrates the error rate as a function of the signal-to-noise ratio when a premodulation filter 2 shown in FIG. 3, with Bb.T=0.19 and $\alpha(2)=0.02$ and a postdemodulation filter 6-4 (6-5) shown in FIG. 3 with Bb.T=0.24 and $\alpha(2)=0.07$ are employed. The gain in signal-to-noise ratio is approximately 1.3 dB.

In practice a simpler premodulation filter 2 may be realized by reversing the sequence of the filters 2-1 and 2-2 shown in FIGS. 2 and 3. In view of the binary character of the input signal the filter 2—2 may then be implemented from digital delay sections.

An embodiment of the filter of FIG. 3 for use as a postdemodulation filter 6-4 (6-5) in the receiver is shown in FIG. 6.

The filter shown in FIG. 6 comprises a minimum-phase network 8, for example as shown in the form of a ladder network, having a transfer function G(jw)' which is given by:

$$G(jw)' = G(jw.\exp(-\alpha(2).e^{-j2wT}) \quad (2)$$

wherein G(jw) represents the transfer function of the Gaussian lowpass filter 2-1 shown in FIG. 3.

For low values of $\alpha(2)$ the pulse response g(t)' of the network 8 is given by:

$$g(t)' = g(t) - \alpha(2)g(t-2T) \quad (3)$$

The terms g(t) and $-\alpha(2)$ g(t−2T), which are necessary to realize the filter shown in FIG. 3 may be realized by the network 8, with the modified transfer function G(jw)'.

The remaining term $-\alpha(2)$ g(t+2T) may be realized by tapping the network 8 in a suitable point before the output. This is performed by providing a tap 9 at a parallel impedance 10. The output signal of the network 8 is combined with the signal on tap 9 by difference producer 11, the output of which forms the output of the postdemodulation filter 6-4 (6-5).

The pulse response h(t) of the filter shown in FIG. 6 is given by:

$$h(t) = g(t) - \alpha(2)g(t-2T) - \alpha(2)g(t+2T) \quad (4)$$

This expression (4) corresponds with expression (1) when it is assumed therein that $\alpha(n)=0$ for n=1 and n>2.

What is claimed is:

1. In a transmitter for angle-modulated signals having an input for synchronous binary signals, a premodulation filter connected to said input, and a frequency modulation arrangement connected to the output of the filter and serving to provide, in response to an input signal voltage, and output signal at a frequency which linearly depends on the amplitude of said input signal voltage; the improvement wherein the premodulation filter has a pulse response h(t) in accordance with the expression:

$$h(t) = g(t) - \sum_{n=1}^{N} \alpha(n)[g(t - nT) + g(t + nT)],$$

wherein g(t) is the pulse response of a Gaussian low-pass filter, T is a delay time equal to the duration of a binary signal element and n is an integer.

2. The transmitter of claim 1 wherein said premodulation filter comprises a Gaussian low-pass filter and a correction filter in series.

3. The transmitter of claim 2 wherein said correction filter comprises a series connection of a plurality of delay sections each having a delay representing the duration of one symbol period of a binary input signal applied to said input, signal summing means, and separate multiplier means for multiplying the outputs of said delay means and applying them to said signal summing means.

* * * * *